US009446384B2

United States Patent
Das et al.

(10) Patent No.: US 9,446,384 B2
(45) Date of Patent: Sep. 20, 2016

(54) ADIABATIC REGENERATION OF SULFUR CAPTURING ADSORBENTS

(75) Inventors: Asit Das, Haryana (IN); Ajay Gupta, Haryana (IN); Bharat Kumar Vaja, Gujrat (IN); Govind Tulsi, Haryana (IN); Harender Bisht, Uttarkhand (IN); Jeyavel Sinha, Tamil Nadu (IN); Shubhangi Jagutse, Maharashtra (IN); Sukumar Mandal, Haryana (IN)

(73) Assignee: Reliance Industries Limited, Mumbai, Maharashtra (IN)

(*) Notice: Subject to any disclaimer, the term of this patent is extended or adjusted under 35 U.S.C. 154(b) by 345 days.

(21) Appl. No.: 13/982,862

(22) PCT Filed: Dec. 14, 2011

(86) PCT No.: PCT/IN2011/000854
§ 371 (c)(1),
(2), (4) Date: Jul. 31, 2013

(87) PCT Pub. No.: WO2012/104864
PCT Pub. Date: Aug. 9, 2012

(65) Prior Publication Data
US 2013/0306906 A1 Nov. 21, 2013

(30) Foreign Application Priority Data
Feb. 2, 2011 (IN) .................... 297/MUM/2011

(51) Int. Cl.
*B01J 20/34* (2006.01)
*C10G 25/12* (2006.01)

(52) U.S. Cl.
CPC ......... *B01J 20/3466* (2013.01); *B01J 20/3433* (2013.01); *B01J 20/3458* (2013.01); *C10G 25/12* (2013.01); *C10G 2300/202* (2013.01); *C10G 2300/807* (2013.01)

(58) Field of Classification Search
CPC ............. B01J 20/3466; B01J 20/3458; B01J 20/3433; C10G 25/12; C10G 2300/202; C10G 2300/807
See application file for complete search history.

(56) References Cited

U.S. PATENT DOCUMENTS

| 4,835,338 A | 5/1989 | Liu |
| 5,157,201 A | 10/1992 | Norris |
| 6,843,907 B1 | 1/2005 | Kanazirev et al. |

FOREIGN PATENT DOCUMENTS

| WO | 03101610 A1 | 12/2003 |
| WO | 2004039926 A1 | 5/2004 |

OTHER PUBLICATIONS

International Search Report of PCT/IN2011/000854, May 31, 2012.

*Primary Examiner* — Peter F Godenschwager
*Assistant Examiner* — Andrew J Oyer
(74) *Attorney, Agent, or Firm* — Collard & Roe, P.C.

(57) ABSTRACT

The present invention provides a process for regeneration of the sulfur capturing spent adsorbents after sulfur capturing using a hydrolyzing agent under adiabatic conditions. In accordance with the process of the present invention hydrolyzing agent is introduced to the spent adsorbent in a controlled manner such that the exothermic heat generated within the adsorbent bed does not rise above the predetermined temperature limit.

8 Claims, 1 Drawing Sheet

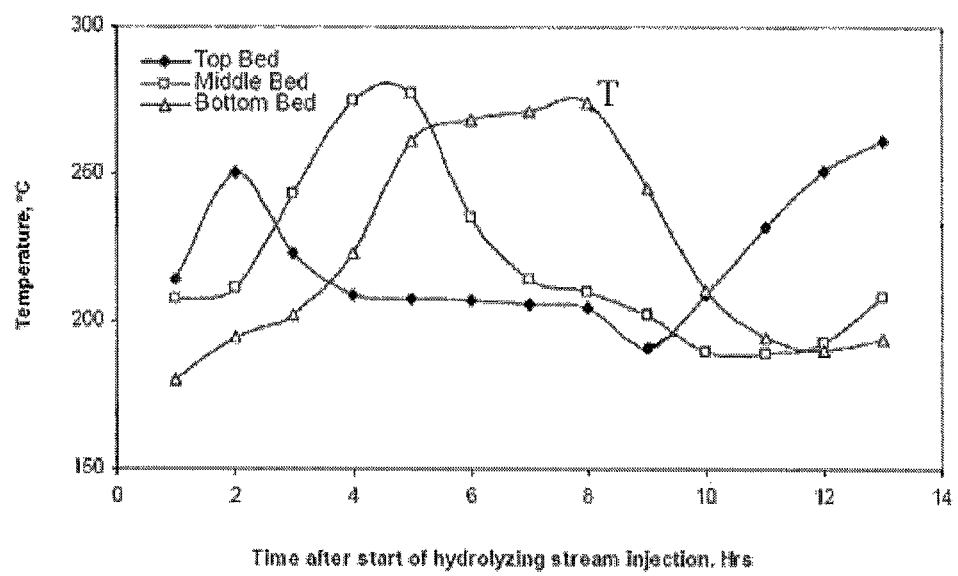

US 9,446,384 B2

ADIABATIC REGENERATION OF SULFUR CAPTURING ADSORBENTS

CROSS REFERENCE TO RELATED APPLICATIONS

This application is the National Stage of PCT/IN2011/000854 filed on Dec. 14, 2011, which claims priority under 35 U.S.C. §119 of Indian Application No. 297/MUM/2011 filed on Feb. 2, 2011, the disclosures of which are incorporated by reference. The international application under PCT article 21(2) was published in English.

FIELD OF THE INVENTION

The invention relates to a process for regeneration of sulfur capturing adsorbents utilized in the hydrocarbon industry for removal of various sulfur impurities. The process of the invention is particularly suitable for alkali or alkaline earth metal/metal oxide impregnated alumina based sulfur adsorbents utilized for removal of carbon disulfide, hydrogen sulfide, mercaptans and carbonyl sulfides.

BACKGROUND

The presence of sulfur containing compounds in hydrocarbon streams is a major cause for concern in the hydrocarbon industry. The presence of sulfur containing compounds such as carbon disulfide, carbonyl sulfide, hydrogen sulfide, mercaptans, sulfides, and disulfides is not desirable in hydrocarbon streams, more particularly in propylene containing hydrocarbon streams as the presence of these sulfur impurities poison/contaminate the catalyst used in propylene polymerization. Furthermore, these sulfur impurities also impart odor to the polypropylene product. The cumulative concentration of sulfur impurities that can be tolerated in a propylene stream is less than 0.5 ppm; more preferably less than 0.1 ppm. The Hydrocarbon industry has adopted various methods for the removal of sulfur impurities from hydrocarbon streams such as alkali treatment, amine treatment, use of regenerable adsorbents having alkali/alkaline earth metal/metal oxide impregnated on alumina support and use of CuO/ZnO, Ni/NiO based non-regenerable adsorbents.

The removal of sulfur impurities from hydrocarbon streams using non-regenerable adsorbents has been disclosed in several patents. However, in due course, use of regenerable spent adsorbents has gained a lot of significance, in order to make the sulfur capturing process more economical and efficient on a commercial scale. There are several patents which describe the processes for regeneration of sulfur capturing adsorbents.
Existing Knowledge:

Following patents disclose the processes for regeneration of sulfur capturing adsorbents, utilized for removal of sulfur impurities from hydrocarbon streams. U.S. Pat. No. 4,835,338 discloses a process for the removal of COS present in a liquid hydrocarbon stream using metal impregnated activated alumina. The spent adsorbent is regenerated in a column by passing a dry gas such as air, hydrocarbons gases, nitrogen or other inert gases through the adsorbent, in the temperature range of 150° C. to 300° C. The regeneration efficiency of the adsorbent decreases drastically after each regeneration cycle and after 3 regenerations, the regeneration efficiency is reduced to 30% of the initial capacity.

U.S. Pat. No. 5,157,201 teaches a process for the removal of sulfur components from olefinic hydrocarbon streams containing propylene and propane, by using hydrodesulfurization catalyst such as CoMo, NiMo, and Ni supported on alumina, in the absence of extraneously added hydrogen. The regeneration of the spent adsorbents is carried out by using air or a mixture of air, nitrogen and steam at a temperature in the range of 400° C. to 500° C.

U.S. Pat. No. 6,843,907 reveals a process for the removal of COS from hydrocarbon streams using alumina supported $Na_2O$ as an adsorbent. It also discloses a regeneration process for the spent adsorbent in the presence of heated gas containing water as a hydrolyzing agent. The regeneration is carried out at lab scale under isothermal conditions using small amounts of adsorbent. However, it is document is silent on the information regarding the exotherm generated while introducing hydrolyzing agent during the regeneration process.

One of the severe shortcomings of the known processes for regenerating the spent sulfur capturing adsorbent under adiabatic conditions using a hydrolyzing agent is that it leads to excessive exotherm generation. The excessive exotherm generation reduces the sulfur loading capacity of the regenerated adsorbents. Furthermore, it also results in the loss of adsorption activity of sulfur capturing adsorbents. There therefore exists a need for a process which is suitable for commercial scale regeneration of the sulfur capturing agent which minimizes the loss in adsorption efficiency of the adsorbent, ensures the longevity of the adsorbent by controlling the excessive exothermic generation.

OBJECTS OF THE INVENTION

Accordingly, the objects of the present invention are as follows:

The object of the present invention is to develop a wet regeneration process for sulfur capturing spent adsorbents.

Another object of the present invention is to develop a wet regeneration process for sulfur capturing spent adsorbents, which is more energy efficient.

Still another object of the present invention is to develop a wet regeneration process for sulfur capturing spent adsorbents that provides substantially better recovery of the active sites of the adsorbents.

Still further object of the present invention is to develop a wet regeneration process for sulfur capturing spent adsorbents that provides regenerated adsorbents with higher sulfur loading capacity Yet another object of the present invention is to develop a faster wet regeneration process for sulfur capturing spent adsorbents.

A further object of the present invention is to provide a wet regeneration process for sulfur capturing spent adsorbents, which increase the longevity of the adsorbents.

A still further object of the present invention is to provide a wet regeneration process for sulfur capturing spent adsorbents which provides high purity, low sulfur products.

These and other objects of this invention will become more apparent from the following detailed description of the invention and the accompanying drawings.

SUMMARY

In accordance with the present invention there is provided an adiabatic wet regeneration process for the sulfur capturing spent adsorbents after sulfur capturing under controlled temperature; said process comprising the following steps:

a first purging step of removing trapped liquid hydrocarbons from the spent adsorbent bed after sulfur capturing by passing a vapor phase hydrocarbon stream;

a second purging step of removing the vapor phase traces of trapped hydrocarbons from the spent adsorbent bed after sulfur capturing by passing a non-reactive regeneration gas stream;

removing the sulfur impurities from the spent adsorbent bed after sulfur capturing by gradually introducing a hydrolyzing agent in a controlled manner, while keeping the rise in initial bed temperature within a pre-determined limit;

continuing the gradual passage of the hydrolyzing agent with increasing concentration to the spent adsorbent bed till a point of time when the bed temperature remains constant even upon the passage of the hydrolyzing agent at its peak concentration;

further continuing the passage of the hydrolyzing agent at its peak concentration to the spent adsorbent bed after sulfur capturing till a point when the adsorbent bed temperature starts to decline; and discontinuing the passage of the hydrolyzing agent to the spent adsorbent bed after sulfur capturing and increasing the temperature of the non-reactive regeneration gas to a temperature in the range of about 270° C. to 350° C. for a period of 1 to 15 hours to obtain a regenerated adsorbent bed.

Typically, the non-reactive regeneration gas is Nitrogen.

Alternatively, the non-reactive regeneration gas is Nitrogen with a moisture content of about 1 to 5 ppm.

Typically, the temperature of the non-reactive regeneration gas stream passing through the sulfur capturing spent adsorbent bed during purging is in the range of 25 to 250° C.

Typically, the purging using the non-reactive regeneration gas stream is carried out for a period of 1 hr to 15 hrs.

In accordance with one of the embodiments, the purging using the non-reactive regeneration gas stream is carried out for a period of about 11 hrs.

Typically after completion of purging, the non-reactive regeneration gas is passed for 4 to 5 hours at constant temperature of 250° C.

Typically, the hydrolyzing agent is water vapor.

Typically, the concentration of the hydrolyzing agent that is passed through the spent adsorbent bed after sulfur capturing, is within the range of 100 ppm to 2000 ppm.

Typically, the initial temperature of spent adsorbent bed after sulfur capturing, after completion of the second purging step is in the range of 100 to 250° C.

In accordance with one embodiment of the invention, the initial temperature of spent adsorbent bed after sulfur capturing after completion of the second purging step is about 214° C.

Typically, the pre-determined limit for sulfur capturing spent adsorbent bed temperature rise with respect to the initial bed temperature is 100° C.

Alternatively, the pre-determined limit for sulfur capturing spent adsorbent bed temperature rise respect to the initial bed temperature is 80° C.

Still alternatively, the pre-determined limit for sulfur capturing spent adsorbent bed temperature rise respect to the initial bed temperature is 36° C.

Typically, the hydrolyzing agent is gradually introduced in a controlled manner for a period in the range of 0.5 hour to 2 hours.

Typically, the peak concentration of the hydrolyzing agent is 2000 ppm.

Alternatively, the peak concentration of the hydrolyzing agent is 1000 ppm.

Typically, the hydrolyzing agent at its peak concentration is passed to the sulfur capturing spent adsorbent bed for a period in the range of 5 hours to 10 hours.

Typically, the total time required for adiabatic wet regeneration of spent adsorbent bed for the process in accordance with the present invention is in the range of 30 hours to 40 hours.

Typically, equilibrium sulfur loading capacity of the regenerated spent adsorbent is in the range of 0.2 to 0.3 wt %.

In accordance with one of the embodiments of the present invention the equilibrium sulfur loading capacity of the regenerated spent adsorbent is 0.25 wt %.

BRIEF DESCRIPTION OF THE ACCOMPANYING DRAWINGS

FIG. 1 illustrates effect of a hydrolyzing agent on the exotherm generated during adiabatic wet regeneration process for sulfur capturing spent adsorbents. The temperature at which the flow of the hydrolyzing agent is stopped in the bottom bed is shown by the letter 'T'.

DETAILED DESCRIPTION OF INVENTION

Regeneration of sulfur capturing spent adsorbents using a hydrolyzing agent is one of the preferred methods used on a commercial scale. The sulfur impurities present in hydrocarbon stream like COS, $CS_2$, $H_2S$ and mercaptans, adsorbed on metal oxide based adsorbent, easily get hydrolyzed to regenerate the spent adsorbents. Sulfur impurities like COS and $CS_2$ chemisorbed on $Na_2O$ impregnated alumina, reacts with water at elevated temperature to give carbon dioxide and hydrogen sulfide thereby regenerating the $Na_2O$ impregnated alumina.

Commercial scale regeneration of the sulfur capturing spent adsorbents using a hydrolyzing agent under adiabatic conditions is accompanied by excessive heat generation. The present invention addresses the problems associated with the generation of excessive heat within the adsorbent bed on account of the exotherm generated during the regeneration of the spend adsorbent.

Accordingly, in accordance with the present invention there is provided a process for regeneration of the sulfur capturing spent adsorbents after sulfur capturing using a hydrolyzing agent under adiabatic conditions wherein the hydrolyzing agent is introduced to the spent adsorbent in a controlled manner such that the exothermic heat generated within the adsorbent bed does not rise above the predetermined temperature limit; said process comprising the following steps:

a first purging step of removing the trapped liquid hydrocarbons from the spent adsorbent bed after sulfur capturing by passing a vapor phase hydrocarbon stream;

a second purging step of removing the vapor phase traces of trapped hydrocarbons from the spent adsorbent bed after sulfur capturing by passing a non-reactive regeneration gas stream;

removing the sulfur impurities from the spent adsorbent bed after sulfur capturing by gradually introducing a hydrolyzing agent in a controlled manner, while keeping the rise in initial bed temperature within a pre-determined limit;

continuing the gradual passage of the hydrolyzing agent with increasing concentration to the spent adsorbent bed till a point of time when the bed temperature remains constant even upon the passage of the hydrolyzing agent at its peak concentration;

further continuing the passage of the hydrolyzing agent at its peak concentration to the spent adsorbent bed after sulfur capturing till a point when the adsorbent bed temperature starts to decline; and discontinuing the passage of the hydrolyzing agent to the spent adsorbent bed after sulfur capturing and increasing the temperature of the non-reactive regeneration gas to a temperature in the range of 270° C. to 350° C. for a period of 5 hours to 15 hours, to obtain a regenerated adsorbent bed.

In accordance with the process of the present invention the temperature of the adsorbent bed is always within a predetermined range. The controlled temperature conditions within the adsorbent bed during the process in accordance of the present invention avoid the possibility of reduction of adsorption efficiency on account of the excess temperature in the spent adsorbent bed. Furthermore, the controlled temperature within the adsorbent bed also ensures the longevity of the adsorbent.

The process of the present invention employs the commercially available sulfur capturing spent adsorbents which include the adsorbents for removal of COS, $CS_2$, $H_2S$ and $CO_2$ and the adsorbent for removal of mercaptans.

Prior to introducing the hydrolyzing agent through the sulfur capturing spent adsorbent bed, the complete removal of the trapped hydrocarbons from the spent adsorbent bed is highly desirable; particularly the propylene in this case. As the propylene trapped in the adsorbent bed, gets oligomerized to form higher hydrocarbons in the presence of alumina and hydrolyzing agent at a temperature greater than >100° C. These higher hydrocarbons form a covering on the adsorbent surface which makes it difficult to be removed during the regeneration process. This adversely affects the adsorption efficiency of the adsorbent beds. Therefore, the complete removal of propylene before starting the regeneration process in the presence of hydrolyzing agent is an important step in accordance with the present invention.

In view of the above, the process of the present invention begins with the first purging step of removing the trapped liquid hydrocarbons from the spent adsorbent bed after sulfur capturing by passing a vapor phase hydrocarbon stream. Typically, the vapor phase hydrocarbon stream is passed through the adsorbent bed at room temperature. This is followed by passage of a non-reactive regeneration gas stream through the spent adsorbent to purge out the vapor phase traces of trapped hydrocarbons from the spent adsorbent bed after sulfur capturing. Typically, the non-reactive regeneration gas that is used in accordance with the present invention is Nitrogen. In one embodiment of the present invention the non-reactive regeneration gas is Nitrogen with moisture content up to 5 ppm.

While in the second purging step of removing the traces of the trapped hydrocarbons in vapor form, the non-reactive regeneration gas is heated gradually to attain a temperature of about 250° C. For ensuring complete purging, the non-reactive regeneration gas at a temperature of 250° C. is typically passed through the spent adsorbent for a period in the range of 1 to 4 hours. In accordance with one of the embodiments of the present invention, the hot regeneration gas with a temperature of 250° C. is passed through the spent adsorbent for a period of 4 hours.

After purging out the traces of the trapped hydrocarbons both liquid and vapor form, a hydrolyzing agent is introduced to the spent adsorbent bed through the non-reactive regeneration gas. Typically, the hydrolyzing agent used in accordance with the present invention is water vapor. The initial bed temperature just before the introduction of the hydrolyzing agent is noted. In one embodiment, the initial temperature of the adsorbent bed before the introduction of the hydrolyzing agent into the adsorbent bed is 214° C. The manner of introducing the hydrolyzing agent is gradual and it starts with a lower concentration of the hydrolyzing agent. Upon introducing the hydrolyzing agent to the sulfur capturing spent adsorbent bed, the hydrolysis process on the adsorbent beds starts. The interaction of the steam with sulfur adsorbed $Na_2O$, CaO or combination thereof, supported alumina is highly exothermic. Because of the adiabatic conditions, the exotherm leads to the rise in temperature of the adsorbent bed. Therefore, the monitoring of the adsorbent bed temperatures starts from the commencement of the incorporation of the hydrolyzing agent to the sulfur capturing spent adsorbent. The adsorbent bed comprises mainly three portions: top bed, middle bed and bottom bed. Maximum saturation of the sulfur impurities takes place in the bottom bed. During desulfurization process of hydrocarbon stream, the adsorbent bottom bed captures the maximum percentage of sulfur impurities as during desulfurization process, said hydrocarbon stream having sulfur impurities flows from bottom to top direction thereby leaving the maximum concentration of sulfur impurities chemisorbed on the bottom bed. Therefore, the maximum regeneration activities take place in the bottom adsorbent bed. Hence, monitoring the temperature rise in the adsorbent bottom bed region is of more significance.

The temperature of the adsorbent bed is monitored continuously during the gradual passage of the hydrolyzing agent. In accordance with the present invention, the exotherm generated during the adiabatic regeneration process for sulfur capturing spent adsorbent bed is controlled by regulating the amount of the hydrolyzing agent. A predetermined limit for the temperature rise of the adsorbent bed is selected and accordingly the concentration of the hydrolyzing agent is controlled in such a manner that the temperature of the adsorbent bed never exceeds the pre-determined limit. Typically, the predetermined limit for the rise in temperature of the adsorbent bed is 100° C. with respect to the initial bed temperature.

In accordance with one embodiment, the predetermined limit for the rise in temperature of the adsorbent bed is 80° C. with respect to the initial bed temperature. In accordance with another embodiment, the predetermined limit for the rise in temperature of the adsorbent bed is 36° C. with respect to the initial bed temperature.

In accordance with the process of the present invention, the range of the concentration of the hydrolyzing agent that is passed through the adsorbent bed under the controlled conditions as mentioned herein above, is in the range of 100 ppm to about 2000 ppm.

While gradually increasing the concentration of the hydrolyzing agent within the constraints defined above, a stage comes when the concentration of the hydrolyzing agent that is passed, reaches to the peak concentration and the temperature of the spent adsorbent bed remains constant even after the passage of the hydrolyzing agent at its peak concentration. Typically, the time period for which the adsorbent bed temperature remains constant even after passage of the hydrolyzing agent at the peak concentration is in the range of 5 hours to 10 hours. In accordance with one embodiment this time period is 5 hours.

Typically, the peak concentration of the hydrolyzing agent is in the range of 500 ppm to 2000 ppm. In accordance with a preferred embodiment of the present invention, the peak temperature of the hydrolyzing agent is 1000 ppm.

The hydrolyzing agent is continued to pass to the spent adsorbent even after the adsorbent bed temperature reaches to a steady state till a point when the adsorbent bed temperature begins to fall below steady state despite the passage of the hydrolyzing agent the peak concentration. The continuous flow of the optimum concentration of the hydrolyzing agent mixed with the non-reactive regeneration gas to the sulfur capturing spent adsorbent bed, leads to completion of the regeneration process. In order to find out the completion of the regeneration process, the temperature rise in the adsorbent beds is monitored; more preferably in the bottom bed. No further rise in adsorbent bottom bed temperature followed by decrease in the adsorbent bottom bed temperature indicates the completion of the regeneration process.

This is an indication of the complete exhaustion of the sulfur present in the adsorbent bed. Once the sulfur present within the adsorbent gets removed, the further passage of the hydrolyzing agent does not generate any exotherm which in turn causes the bed temperature of the bed to fall.

The temperature rise in the different portions of the adsorbent beds i.e. in the top bed, in the middle bed and in the bottom bed is shown with the aid of FIG. 1.

FIG. 1 represents the temperature variations of adsorbent beds during adiabatic regeneration process in accordance with the present invention.

As shown in FIG. 1, with the commencement of the regeneration process, a sharp peak in the adsorbent top bed region is observed followed by the peaks in the middle bed and bottom bed respectively. During the regeneration process, the non-reactive regeneration gas stream flows from the top to bottom, therefore, the regeneration process first take place in the top bed region followed by the middle bed and bottom bed respectively. In comparison to the sharp peak observed in the top bed region, the middle bed and bottom bed region shows significantly broader peaks. The areas covered under the peaks correspond to the amount of sulfur impurities adsorbed on the adsorbent beds. From FIG. 1 of the present invention, it is clearly evident that the maximum sulfur impurities are adsorbed on the bottom bed in comparison to the top and middle beds. Therefore, the maximum heat generation takes place in the bottom bed.

The plateau phase of the adsorbent bed temperature profile indicates no excessive rise in adsorbent bed temperature even upon continuously introducing the controlled amount of hydrolyzing agent at a regeneration gas temperature of 250° C.

In the next stage, i.e after the completion of the regeneration of the adsorbent bed, the passage of the hydrolyzing agent to the spent adsorbent is discontinued and the temperature of the non-reactive regeneration gas is increased to a temperature in the range of 270° C. to 350° C. In one embodiment, the temperature of the regeneration gas is increased to 330° C.

This is also shown in FIG. 1; wherein the passage of the hydrolyzing agent is discontinued at the decline of adsorbent bottom bed temperature. The non-reactive regeneration gas at a temperature is continued to pass for a period of 5 to 15 hours to remove the traces of the trapped hydrocarbons.

Typically, the total regeneration time for the spent adsorbent by the process of the present invention is 30 to 40 hours. In one embodiment, the total regeneration time in accordance with the process of the present invention is 32 hours.

In accordance with one of the embodiments, the regeneration gas at a temperature of 330° C. along with 5 ppm of hydrolyzing agent is passed to the adsorbent bed after the completion of the regeneration process.

The adsorbent bed is allowed to cool to room temperature after the passage of the regeneration gas at a temperature of 270° C. to 350° C.

Typically, the equilibrium sulfur loading capacity of the regenerated adsorbent obtained by the process of the present invention is in the range of 0.2 to 0.3 wt %. In accordance with one of the embodiments of the present invention, the equilibrium sulfur loading capacity of the regenerated adsorbent is about 0.25 wt %. The invention is further illustrated by way of the following non-limiting examples. In order to establish the efficiency of adiabatic regeneration process using hydrolyzing agent, in terms of sulfur loading capacity, three different experiments were carried out.

Comparative Example A

Regeneration in the Absence of Hydrolyzing Agent

One set of experiment was carried with out using hydrolyzing agent at a regeneration gas temperature of about 350° C. (Table-1)

TABLE 1

| Time (hrs) | Regeneration Gas Temp. (° C.) | Treater Outlet Temp. (° C.) | Treater Top Bed Temp. (° C.) | Treater Middle Bed Temp. (° C.) | Treater Bottom Bed Temp. (° C.) | Remarks |
| --- | --- | --- | --- | --- | --- | --- |
| 0 | 26 | 29 | 29 | 29 | 29 | Heating started |
| 11 | 350 | 100 | 136 | 214 | 284 | Regeneration gas temp. attained 350° C. |
| 51 | 350 | 283 | 316 | 315 | 311 | 40 hrs at 350° C. regeneration gas temp., cooling started |
| 72 | 27 | 37 | 29 | 29 | 29 | Room temp. attained, regeneration complete. |

Dry non-reactive regenerating gas stream was allowed to pass through the adsorbent bed. The heating of the regeneration gas stream was started and continued till the regeneration gas achieved a temperature of about 350° C. At the regeneration gas temperature of 350° C., the maximum bed temperature reached was 316° C. The regeneration process at a temperature of about 350° C. was continued for 40 hrs in order to completely regenerate the bed. The complete regeneration of the adsorbent bed was monitored by presence of $H_2S$ gas in the treater outlet. The total regeneration time was 51 hrs. The heat requirement in case of dry regeneration is very high.

Comparative Example B

Regeneration in Presence of Hydrolyzing Agent with High Regeneration Gas Temperature (350° C.)

The heating of regeneration gas stream was started; when the temperature of regeneration gas stream reached at 350° C., the introduction of hydrolyzing agent into the regeneration vessel was started. After introducing the hydrolyzing agent, the bed temperature quickly shot up to 325° C. from 298° C. in 3 hrs and the flow of hydrolyzing steam and regenerations gas heating was cut off to control the temperature rise.

Again on starting the hydrolyzing stream, exotherm was observed in all treater beds. Total regeneration time was 76 hrs in case of introduction of hydrolyzing agent at 350° C. regeneration gas temperature.

Example 1

Regeneration of the Spent Adsorbent in the Presence of a Hydrolyzing Agent in Accordance with the Present Invention A vapor phase hydrocarbon stream was passed through the adsorbent bed for purging out the trapped liquid hydrocarbons. A non-reactive gas stream was introduced to the adsorbent bed for removing the vapor phase traces of trapped hydrocarbons. Heating of the non-reactive regenerating gas stream flowing through the adsorbent bed was started and continued till the regeneration gas temperature reached at 250° C. At this temperature, the hydrolyzing agent was introduced in the regeneration vessel. In presence of hydrolyzing agent, the adsorbent bed temperature started to increase and reached to a maximum of 277° C. from the initial bed temperature of 214° C. (Predetermined Temperature rise of 63° C. from the initial Bed temperature) At a maximum adsorbent bed temperature of 277° C., the introduction of hydrolyzing agent in the concentration of about 1000 ppm (peak concentration) was continued without experiencing any uncontrolled increase in the adsorbent bed temperatures. Once the rise in bottom bed temperature stopped, the regeneration was completed and the hydrolyzing stream was stopped. Again the regeneration gas temperature was increased to 350° C. for complete removal of hydrolyzing agent from the adsorbent beds. The temperature of regeneration gas stream at 350° C. was maintained for 10 hrs. In the final stage of regeneration process, the cooling was started till the regeneration gas and adsorbent beds achieved the room temperature.

TABLE 2

| Time (hrs) | Regeneration Gas Temp. (° C.) | Treater Outlet Temp. (° C.) | Treater Top Bed Temp. (° C.) | Treater Middle Bed Temp. (° C.) | Treater Bottom Bed Temp. (° C.) | Remarks |
|---|---|---|---|---|---|---|
| 0 | 27 | 21 | 29 | 29 | 29 | Heating started |
| 14 | 350 | 111 | 273 | 257 | 152 | Regeneration gas temp attained 350° C. |
| 37 | 350 | 259 | 293 | 298 | 298 | 23 hrs at 350° C. regeneration gas, Steam injection started. |
| 38 | 350 | 260 | 308 | 297 | 297 | Peak of top bed |
| 40 | 350 | 260 | 293 | 325 | 295 | Peak of middle bed |
| 42 | 350 | 266 | 298 | 294 | 319 | Peak of bottom bed; Steam injection stopped, Heating started. |
| 76 | 350 | 260 | 303 | 309 | 299 | 34 hrs at regeneration gas temp 350° C.; several attempts of steam injection, cooling started. |
| 100 | 25 | 31 | 29 | 29 | 29 | Room temp. attained, regeneration complete. |

TABLE 3

| Time (hrs) | Regeneration Gas Temp. (° C.) | Treater Outlet Temp. (° C.) | Treater Top Bed Temp. (° C.) | Treater Middle Bed Temp. (° C.) | Treater Bottom Bed Temp. (° C.) | Remarks |
|---|---|---|---|---|---|---|
| 0 | 31 | 29 | 29 | 29 | 29 | Heating started |
| 11 | 250 | 75 | 185 | 126 | 89 | Regeneration gas temp attained 250° C. |
| 15 | 250 | 128 | 214 | 208 | 179 | 4 hrs at 250° C. regeneration gas, Steam injection started. |
| 16 | 250 | 148 | 250 | 211 | 194 | Peak of top bed |
| 19 | 250 | 186 | 208 | 277 | 256 | Peak of middle bed |
| 22 | 250 | 227 | 205 | 210 | 274 | Peak of bottom bed; Steam injection stopped, Heating started. |
| 28 | 330 | 176 | 268 | 232 | 195 | Regeneration gas temp attained 330° C., Maintained for 10 hrs. |
| 38 | 330 | 235 | 287 | 284 | 275 | Cooling started |
| 58 | 25 | 26 | 29 | 29 | 29 | Room Temp attained; Regeneration complete |

The temperature profile of the adsorbent bed during the wet regeneration process for Example No 1 is provided in a graph in FIG. 1.

Comparative Studies:

The comparative results are shown in Table 4.

TABLE 4

Comparison of Sulfur Loading Capacity after Regeneration.

| Regeneration Gas Temp (° C.) | Max. Bed Temp. (° C.) | Regeneration duration (hr) | Hydrolyzing agent (Steam), ppm | No. of days between successive regeneration | Equilibrium Sulfur loading (wt %) |
|---|---|---|---|---|---|
| 350 Comparative Example A | 316 | 51 | 0 | 4 | 0.15 |
| 350 Comparative Example B | 342 | 76 | 1000* | 7 | 0.25 |
| 250 Example 1 (Present Invention) | 277 | 38 | 1000 | 7 | 0.25 |

*= Intermittent flow of steam to control the exotherm below 350° C.

The sulfur loading of adsorbent bed was estimated by measuring the total sulfur impurity (in ppm) at adsorbent bed inlet and outlet at constant flow of hydrocarbon stream. Once the total sulfur at the adsorbent bed outlet showed sharp rise, it was inferred that breakthrough had been achieved. With the help of total sulfur concentration at adsorbent inlet and outlet, number of days to reach the breakthrough and total mass of the adsorbent the sulfur loading on the adsorbent was calculated. It was found, that the sulfur loading capacity was lowest (0.15%) in case of dry regeneration i.e. without using hydrolyzing agent. (Comparative Example A). There was an improvement of about 66% in the equilibrium sulfur loading capacity when the regeneration was carried out by wet regeneration process.

The disadvantage of the wet regeneration process carried out at high temperature is the high regeneration time of about 76 hours. As against this, the process in accordance with the present invention, the regeneration time was just 38 hours. Apart from the pronounced reduction the regeneration time, there is also an increase in the time between two regenerations (from 4 to 7 Days) in case of the process of the present invention (Example 1). The increased time between two regenerations for the process of the present invention ensures a longer life of to adsorbent being used.

The adiabatic wet regeneration process in accordance with the present invention is an energy efficient process. It provides a regenerated adsorbent with better sulfur loading capacity and prolonged life. The part of heat energy required for regeneration process of the present invention is taken from the exotherm generated during adiabatic wet regeneration process.

While certain embodiments of the inventions have been described, these embodiments have been presented by way of examples only, and are not intended to limit the scope of the inventions. Variations or modifications to the design and construction of this invention, within the scope of the invention, may occur to those skilled in the art upon reviewing the disclosure herein. Such variations or modifications are well within the spirit of this invention. The accompanying claims and their equivalents are intended to cover such forms or modifications as would fall within the scope and spirit of the invention.

The numerical values given for various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

The invention claimed is:

1. A process for adiabatic wet regeneration of spent adsorbent bed after sulfur capturing in the presence of a hydrolyzing agent; said process comprising the following steps:
   i. a first purging step of removing trapped liquid hydrocarbons from the spent adsorbent bed after sulfur capturing by passing a vapor phase hydrocarbon stream;
   ii. a second purging step of removing the vapor phase traces of trapped hydrocarbons from the spent adsorbent bed after sulfur capturing by passing a non-reactive regeneration gas stream, wherein the second purging is carried out for a period of 1 hour to 4 hours;
   iii. removing sulfur impurities by introducing the hydrolyzing agent to the spent adsorbent bed through the non-reactive regeneration gas, while increasing a temperature of the spent absorbent bed within a limit ranging from 36° C. to 100° C. above an initial bed temperature,
   wherein the hydrolyzing agent is having a concentration in the range of 100 ppm to 2000 ppm and is introduced for a period in the range of 0.5 hour to 2.0 hours,
   wherein the temperature of the spent absorbent bed after the second purging step of the spent adsorbent bed after sulfur capturing is in the range of 100° C. to 250° C.;
   iv. continuing the passage of the hydrolyzing agent with increasing concentration to the spent adsorbent bed till a point of time when the bed temperature remains constant even upon the passage of the hydrolyzing agent at its peak concentration;
   v. further continuing the passage of the hydrolyzing agent at its peak concentration to the spent adsorbent bed after sulfur capturing till a point when the adsorbent bed temperature starts to decline; and
   vi. discontinuing the passage of the hydrolyzing agent to the spent adsorbent bed after sulfur capturing and increasing the temperature of the non-reactive regeneration gas to a temperature in the range of 270° C. to 350° C. for a period of 5 hours to 15 hours, to obtain a regenerated adsorbent bed;
   wherein the total time required for regeneration of the spent adsorbent bed is in the range of 30 hours to 40 hours.

2. The process as claimed in claim 1, wherein the non-reactive regeneration gas is Nitrogen.

3. The process as claimed in claim 1, wherein the non-reactive regeneration gas is Nitrogen with moisture content up to 5 ppm.

4. The process as claimed in claim 1, wherein the temperature of the non-reactive regeneration gas stream passing through the spent adsorbent bed after sulfur capturing during the second purging is in the range of 25° C. to 250° C.

5. The process as claimed in claim 1, wherein the hydrolyzing agent is water vapor.

6. The process as claimed in claim 1, wherein the peak concentration of the hydrolyzing agent is in the range of 1000 ppm to 2000 ppm.

7. The process as claimed in claim 1, wherein the hydrolyzing agent at its peak concentration is passed to the adsorbent bed for a period in the range of 5 hours to 10 hours.

8. The process as claimed in claim 1, in which equilibrium sulfur loading capacity of the regenerated adsorbent is in the range of 0.2 to 0.3 wt %.

* * * * *